May 18, 1965   J. T. KARPUS, JR   3,183,932
REGULATOR VALVE

Filed July 13, 1961   3 Sheets-Sheet 1

INVENTOR.
JOHN T. KARPUS, JR.
BY
John Wade Ball Jr.
ATTORNEY

United States Patent Office

3,183,932
Patented May 18, 1965

3,183,932
REGULATOR VALVE
John T. Karpus, Jr., Detroit, Mich., assignor to Pneumo-Dynamics Corporation, Cleveland, Ohio, a corporation of Delaware
Filed July 13, 1961, Ser. No. 123,843
7 Claims. (Cl. 137—614.19)

The instant invention relates to regulator valves adapted to provide a constant mass flow of fluid from the valve, with the regulating operation of the valve being in response to the pressure of the fluid inflowing to the valve.

It is an object of the instant invention to provide an improved regulator valve operating in response to the pressure of the fluid supplied to the valve to produce a constant mass flow of fluid from the valve.

It is another object of the instant invention to provide an improved regulator valve in which the pressure of the supply fluid acts on a regulator member, for operation of the latter in response to the pressure of the supply fluid to regulate the flow of the fluid from the valve.

It is a further object of the instant invention to provide an improved regulator valve having a regulator member with a relatively high spring rate for stability of operation of the regulator member.

It is also an object of the instant invention to provide an improved regulator valve having a valve for controlling the quantity of fluid flow, and a regulating element either independent or dependent of the controlling valve for regulation of the fluid discharged by the valve.

Still another object of the instant invention is to provide an improved regulator valve having a valve for control of the quantity of fluid flow through the valve, and a regulating element for regulation of the fluid, which is independent of the control valve, with means being provided for communicating supply fluid under pressure to the regulating element at all times, whereby the regulating element is maintained in regulated position irrespective of flow of fluid through the valve.

Further objects and advantages of the instant invention will appear from the description thereof which follows, reference being had to the drawings wherein.

Figure 1:
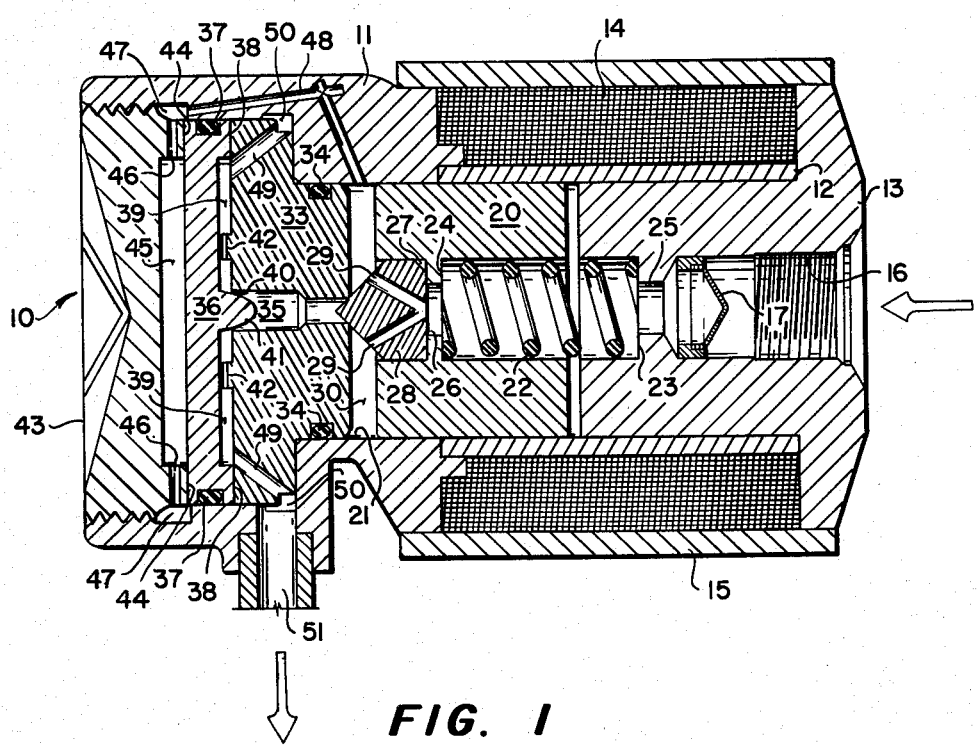
FIGURE 1 is a longitudinal sectional view of the regulator valve.

Referring to the drawings, there is illustrated therein a valve 10 constructed in accordance with the instant invention and comprising a valve body 11. A cylindrical solenoid liner 12 is secured to the valve body 11 and extends axially therefrom. A solenoid cap member 13 projects within the solenoid liner 12 and is secured thereto. A solenoid 14 is wound on the solenoid liner 12 within the confines of the space defined by the valve body 11, the solenoid liner 12 and the solenoid cap member 13. A solenoid case 15 having a cylindrical configuration is placed over the solenoid 14 to provide a cover therefor, and the solenoid case 15 is secured to the valve body 11 and the solenoid cap member 13. The elements 11, 12, 13, 15, within which the solenoid 14 is enclosed, may be secured to each other in such manner as to seal the solenoid 14 for protection of the latter. Electrical leads from the solenoid 14 may be led out through the solenoid case 15 for connection to a source of current by which the solenoid 14 is energized.

The solenoid cap member 13 is formed with a threaded bore 16 for connection of a suitable line to the valve 10 for the delivery of inflowing fluid thereto. A filter screen 17 is secured in place in the bore 16 for filtering the fluid flowing through the valve 10.

A solenoid core 20 is reciprocably supported in the cylindrical bore 21 that is formed within the valve body 11 and the solenoid liner 12. The solenoid core 20 is formed of magnetic material, and upon energization of the solenoid 14, the solenoid core 20 will be acted upon by the magnetic force thus created and moved in an axial direction within the bore 21. A compression spring 22 is supported at one end in a spring seat 23 formed in the solenoid cap member 13, and the opposite end of the compression spring 22 is supported in a spring seat 24 formed in the solenoid core 20. Thus, the compression spring 22 acts to move the solenoid core 20 to the left, as viewed in the drawings, and upon energization of the solenoid 14, the magnetic force created thereby will overcome the force of the compression spring 22 and act to move the solenoid core 20 to the right, as viewed in the drawing. Upon de-energization of the solenoid 14, the compression spring 22 will again act to return the solenoid core 20 to the left.

The fluid delivered to the valve 10 inflows through a fluid inlet bore 16 to a connecting bore 25, and then through the spring seats 23, 24 to a connecting bore 26. The solenoid core 20 is formed with a recess 27 at its downstream side within which there is disposed a valve element 28, which may be formed of nylon, or like material. The valve element 28 has a plurality of obliquely extending ports 29 which connect to the bore 26 and lead fluid from the bore 26 to a fluid supply chamber 30.

A partition wall 33 is disposed in the valve body 11 and projects into the cylindrical bore 21. An O-ring 34 forms a seal between the partition wall 33 and the cylindrical bore 21. The fluid supply chamber 30 is defined by the bore 21, the solenoid core 20, and the partition wall 33, and consists of the space between these members. An inlet passage 35 extends axially through the partition wall 33, and the upstream end of the inlet passage 35 serves as a valve seat for the valve element 28. When the solenoid core 20 is moved to the left by the compression spring 22, the conical portion of the valve element 28 seats in the inlet passage 35 and closes the same, whereby there will be no inflow of fluid from the fluid supply chamber 30 to the inlet passage 35. Upon energization of the solenoid 14, the valve element 28 will be removed from the inlet passage 35, by movement of the solenoid core 20 to the right, which opens the inlet passage 35 to the fluid supply chamber 30 for inflow of fluid from the fluid supply chamber 30 to the inlet passage 35.

A flexible regulator member 36 is disposed in the valve body 11 behind the partition wall 33. An O-ring 37 provides a peripheral seal between the regulator member 36 and the valve body 11. The regulator member 36 is spaced from the partition wall 33 by an annular land 38, to form a fluid discharge chamber 39 between the regulator member 36 and the partition wall 33. The inlet passage 35 has a discharge opening 40 through which fluid outflows into the fluid discharge chamber 39. In longitudinal axial alignment with the inlet passage 35, the regulator member 36 is formed with a valve portion 41, which is formed integral with the regulator member 36. The valve portion 41 is of substantially the same area as the area of the discharge opening 40, and the outflowing fluid from the inlet passage 35 flows into the fluid discharge chamber 39 through the constriction formed between the discharge opening 40 and the regulator member valve portion 41. As will be explained hereinafter, the spacing of the regulator member valve portion 41 from the discharge opening 40 is variable, by which regulation of the fluid is achieved. The partition wall 33 is formed with lands 42, which project toward the regulator member 36, and limit the minimum spacing of the regulator member valve portion 41 from the discharge opening 40.

The valve body 11 is closed by an end cap 43, which may be threaded into the valve body 11 and sealed. The end cap 43 is formed with an annular land 44 extending in an axial direction towards the regulator member 36, to form a regulating chamber 45 between the end cap 43 and the regulator member 36. The end cap 43 is formed with a plurality of radial ports 46, which extend through the annular land 44 and open to the regulating chamber 45. Between the end cap 43 and the valve body 11 there is formed an annular fluid passage 47, which is in communication with the radial ports 46. A fluid passage 48 extends through the valve body 11 and connects the fluid supply chamber 30 to the annular passage 47, for communication of the supply pressure of the fluid in supply chamber 30 through the passage 48 to the annular fluid passage 47, and thence through the radial ports 46 to the regulating chamber 45.

The partition wall 33 includes a plurality of obliquely disposed discharge ports 49, which connect the fluid discharge chamber 39 to an annular fluid discharge passage 50 that is formed by the partition wall 33 and the valve body 11. The annular fluid discharge passage 50 is connected to a valve discharge 51, through which regulated fluid is delivered from the valve 10.

The valve 10 of this invention may be used for regulation of the flow of fluid from a storage tank in which the fluid is stored in compressed condition, at an extremely high pressure far in excess of the pressure of the fluid which is delivered by the valve discharge 51. As fluid continues to be delivered from the storage tank, the pressure of the fluid delivered to the valve will progressively decrease, whereby the valve functions to provide constant mass flow of fluid at varying inlet pressures. The fluid supply chamber 30 is in communication with the source of fluid at all times, and the pressure of the fluid at the inlet bore 16 is communicated through the passage 48, the annular passage 47, and the radial ports 46 to the regulating chamber 45, irrespective of whether there is any fluid flow through the valve 10 to the valve discharge 51.

Thus, the supply pressure of the fluid acts at all times on the regulator member 36. The regulator member 36 is a flexible element, which is responsive to the supply pressure of the fluid in the regulating chamber 45. One wall of the regulating chamber 45 is formed by the rear face of the regulator member 36, providing an area of substantial size. The rear face of the regulator member 36 is acted on by the supply pressure of the fluid in the regulating chamber 45, to provide a force of substantial magnitude to flex the regulator member 36, whereby the flexing of the regulator member 36 operates to space the valve portion 41 of the regulator member 36 from the wall of the inlet passage 35 in direct proportion to the supply pressure of the fluid. The regulator member 36 is formed with a substantial wall thickness to have a relatively high spring rate for the elimination of fluttering of the regulator member 36, to permit precise calibration of the regulating valve 10, and provide stability of the regulating operation thereof. In one embodiment of the instant invention, the regulator member 36 has been formed of beryllium copper, although it will be understood that other materials can be used for the regulator member 36.

When the valve element 28 is opened, the fluid at supply pressure inflows to the inlet passage 35 and outflows through the discharge opening 40, through the constriction formed between the regulator member valve portion 41 and the wall of the inlet passage 35. The degree of constriction formed between the regulator member valve portion 41 and the wall of the inlet passage 35 will be directly proportional to the supply pressure of the fluid, by virtue of the fluid force acting on the regulator member 36 in the regulating chamber 45. Responsive to the fluid pressure at the inlet bore 16 the regulator member 36 will flex to vary the degree of constriction whereby the mass flow rate through the fluid outlet 51 will be a constant.

In the regulating valve 10, when the valve element 28 is open for inflow of the fluid, the supply pressure of the fluid will act on the regulator member valve portion 41, as well as on the rear face of the regulator member 36 which is disposed in the regulating chamber 45. However, the area of the valve portion 41 is quite small compared with the area of the regulator member 36 exposed to the fluid supply pressure in the regulating chamber 45, so that the force acting on the regulator member 36 due to the fluid supply pressure imposed on the valve portion 41 will not be of any significance in the regulating operation of the regulator member 36. Also, since the regulator member 36 is constructed with a relatively high spring rate, which causes it to be extremely stable in operation, there will be no significant effect of the fluid supply pressure acting on the relatively small area of the regulator member valve portion 41 when the valve element 28 is opened.

By this invention, there is provided an improved regulator valve for supplying a constant mass flow of fluid from a variable pressure source. In the novel valve shown in FIGURE 1, the regulating means by which the discharge pressure of the fluid is controlled operates independently of the valve by which the flow of fluid is started and stopped. The pressure of the supply fluid is communicated to the regulating means at all times, so that when the flow of fluid through the valve is initiated, the regulating means is in condition to perform its regulating function on to the fluid flowing through the valve.

Figure 2:
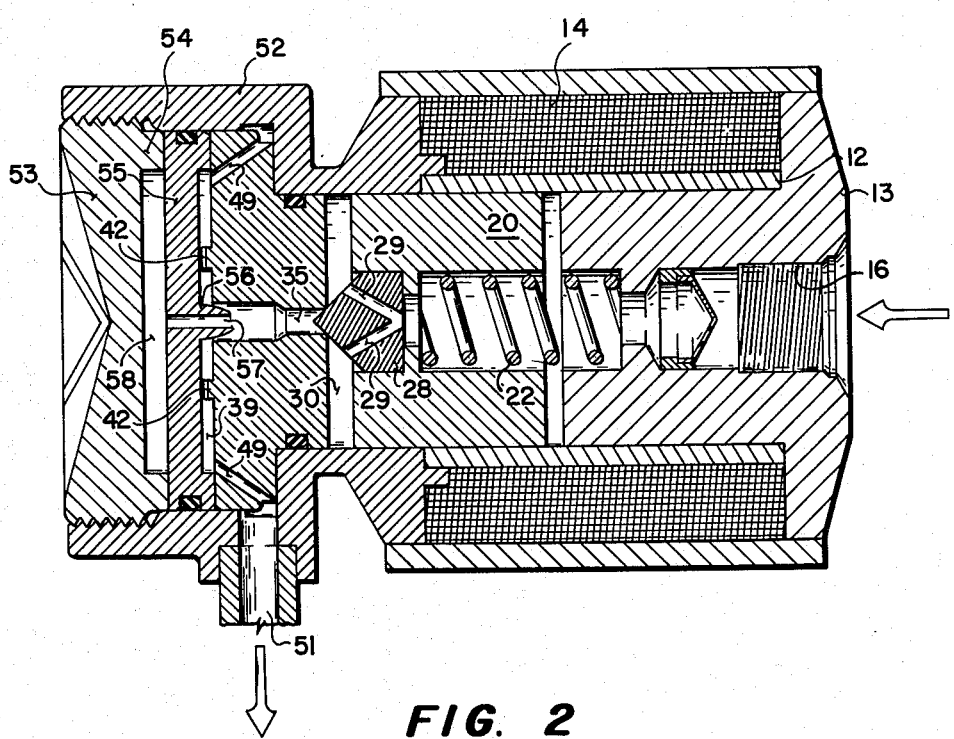
FIGURE 2 is a longitudinal sectional view of a modified form of regulator valve.

A modified form of the invention is shown in FIGURE 2. A valve body 52 is made solid in longitudinal cross section and an end cap 53 has solid lands 54. A regulator member 55 has a valve portion 56 secured thereto and an opening 57 is provided which extends through the valve portion and the regulator member. The spring 22 normally holds the valve element 28 in the inlet passage 35 so that fluid cannot flow from supply chamber 30 into the inlet passage and also fluid cannot flow into the regulating chamber 58. When the solenoid is energized the solenoid core 20 is moved to the right against the force of the spring 22, carrying with it the valve element 28. The inlet passage 35 is thus opened allowing fluid under pressure to flow through the inlet passage through the opening 57 and into the regulator chamber 58. The regulator member 55 moves to the right responsive to the pressure of the fluid in chamber 58 to vary the spacing of the valve portion 56 from the peripheral wall of the inlet passage 35 effective to regulate the pressure of the fluid flowing out through the valve discharge 51. From the above, it will be seen that in the modified form of the invention illustrated in FIGURE 2, the regulating means by which the discharge pressure of the fluid is controlled is dependent on the passage of fluid through valve 28.

Figure 3:
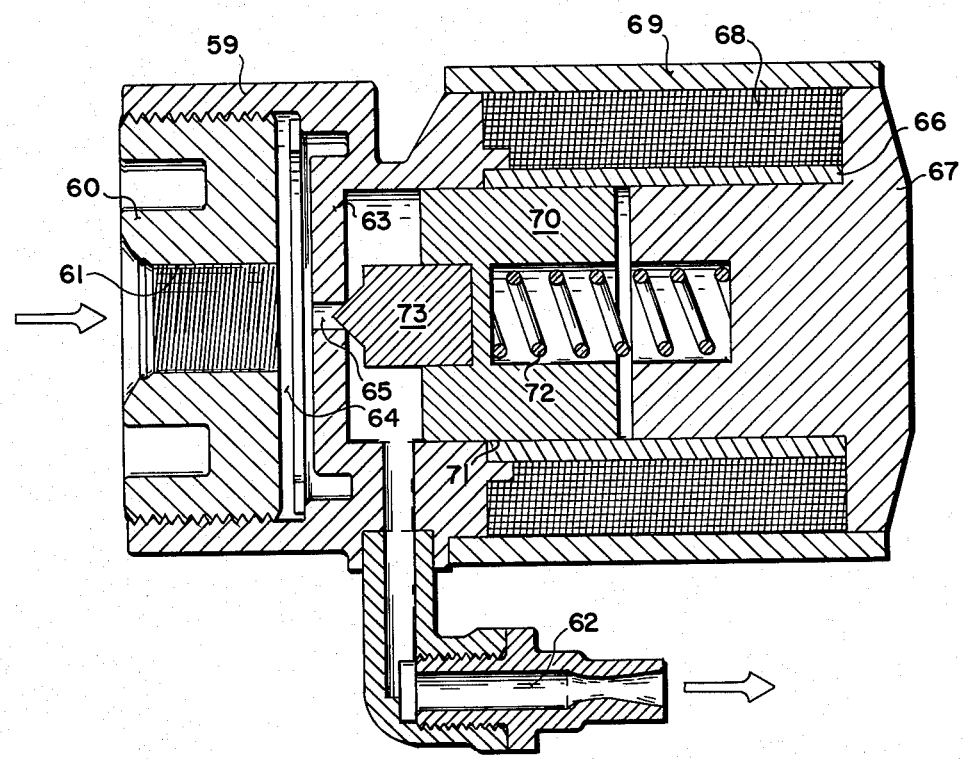
FIGURE 3 is another longitudinal sectional view of another modified form of regulator valve.

Another modified form of the invention is shown in FIGURE 3. A valve body 59 is provided and an end cap 60 is threaded into the valve body and the end cap has a fluid inlet 61 from the storage tank and the valve body has a fluid outlet 62. A regulator member 63 is made integral with the valve body 59 and is fabricated so as to be flexible and springy and is spaced from the end cap to form a regulator chamber 64. The regulator member 63 is provided with an opening 65. A cylindrical solenoid liner 66 is secured to the valve body 59 and the solenoid cap member 67 projects within the solenoid liner and is secured thereto. A solenoid 68 is wound on the solenoid liner 66 and a solenoid case 69 having a cylindrical configuration is placed over the solenoid to provide a cover therefor, and the solenoid case is secured to the valve body 59 and the solenoid cap member 67. A solenoid core 70 is reciprocably supported in the cylindrical bore 71 that is formed in the valve body 59 and in solenoid liner 66. A compression spring 72 is disposed in a recess in the solenoid core 70 and is also disposed in a recess in the solenoid cap member 67. A valve element 73 is press fitted in another recess in the solenoid core 70.

In operation, fluid flows into the fluid inlet 61 and into the regulator chamber 64 and urges the regulator member 63 to the right as shown in FIGURE 3 in accordance with the pressure of the fluid in the fluid inlet. The spring 72 normally holds the valve element 73 seated in the opening 65 in the regulator member 63 so that fluid cannot flow through the opening 65 thus preventing fluid from flowing out the fluid outlet 62. When the solenoid is energized, the solenoid core 70 is moved to the right against the force of the spring 72 thus moving the valve element 73 to the right. Since the regulator member 63 is flexed to the right by an amount proportionate to the fluid pressure in the fluid inlet 61, a constriction is created between the opening 65 and the valve element 73. The size of this constriction will vary responsive to the pressure of the fluid in the chamber 64. At higher inlet pressures at fluid inlet 61 the flexing of the regulator member 63 to the right as shown in FIGURE 3 will be greater and the constriction will be smaller. At lower inlet pressures at fluid inlet 61 the flexing of the regulator member 63 to the right as shown in FIGURE 3 will be lesser and the constriction will be larger. The fluid enters the valve through the fluid inlet 61 and flows through the regulator chamber 64 and then through the opening 65 and then between the regulator member 63 and the solenoid core 70 and flows out of the valve through the fluid outlet 62.

| Inlet fluid pressure from the storage tank into fluid inlets 16, or into fluid inlet 61 in pounds per square inch | Mass flow rate from fluid outlets 51 or fluid outlet 62 in pounds per second |
|---|---|
| 200 p.s.i. | .0075 lbs./sec. |
| 250 p.s.i. | .0075 lbs./sec. |
| 3000 p.s.i. | .0075 lbs./sec. |

The above table is merely illustrative and is not to be construed as limiting the invention. In all three embodiments of the invention, the mass flow rate from the valve discharges 51, or 62 may be changed from one constant value to another constant value by changing the size or contour of the valve portion 41 or 56 or valve element 73 and by changing the design of the internal surfaces of the discharge valve nozzles 51 or 62.

Thus it will be seen from the foregoing that in all three embodiments of the invention shown in FIGURES 1, 2 or 3 that regardless of the fluid pressure at the inlet of the valve the mass flow rate from the discharge or fluid outlet of the valve will be a constant.

While applicant has shown three embodiments of the invention, there are still many alterations and modifications that could be made within the principles and spirit of the invention. It is the intention of the applicant to cover every alteration or modification that is within the scope of the appended claims.

What is claimed is:

1. A combination shut-off and constant mass flow regulator valve for controlling the flow of fluid therethrough comprising a casing provided with a fluid inlet for receiving fluid under pressure and a fluid outlet for discharging the fluid, valve means in the casing to prevent flow of fluid through the fluid outlet, yieldable means normally holding the valve means in closed position, means for opening the valve means against the force of the yieldable means to allow flow of fluid through the fluid outlet, a passageway formed in said casing, a regulator chamber in the casing receiving fluid under pressure from the fluid inlet, and a regulator member disposed in the casing and having a projecting portion extending therefrom, said regulator member being movable responsive to the pressure of the fluid in the regulator chamber operable to position said projecting portion relative to said passageway to deliver a constant mass flow rate through the fluid outlet at varying inlet pressures.

2. A combination shut-off and constant mass flow regulator valve for controlling the flow of fluid therethrough comprising a casing provided with a fluid inlet for receiving fluid under pressure and a fluid outlet for discharging the fluid, a partition wall disposed in the casing and provided with a fluid passage therethrough having an entrance and an exit, a flexible regulator member disposed in the casing and having one face spaced from an end wall of the casing to form a regulating chamber and having its other face spaced from the partition wall to form a fluid discharge chamber, a portion of said regulator member being spaced from the exit of the fluid passage in the partition wall for valving the flow of fluid therethrough, a valve element movably mounted in the casing, yieldable means holding the valve element in the entrance of the fluid passage in the partition wall to prevent flow of fluid into the fluid passage, a solenoid carried by the casing for moving the valve element away from the entrance in the fluid passage in the partition wall against the force of the yieldable means to let fluid flow through the fluid passage into the fluid discharge chamber through the fluid outlet, and passage connecting the fluid inlet to the regulating chamber for communicating inflowing fluid under pressure with the regulating chamber to act on the face of the regulator member in the regulating chamber and to vary the spacing of the portion of said regulator member from the exit in the fluid passage in the partition wall responsive to the pressure of the inflowing fluid to regulate the pressure of the outflowing fluid and to provide a constant mass flow to said fluid outlet at varying inlet pressures.

3. A combination shut-off and constant mass flow regulator valve for controlling the flow of fluid therethrough comprising a casing provided with a fluid inlet for receiving fluid under pressure and a fluid outlet for discharging the fluid, a partition wall disposed in the casing and provided with a fluid passage therethrough having an entrance and an exit, a flexible regulator member disposed in the casing and having one face spaced from an end wall of said casing to form a regulating chamber and having its other face spaced from the partition wall to form a fluid discharge chamber, means on said regulator member cooperable with the passageway in said partition wall to vary the flow of fluid therethrough, said means having an opening therein extending through the regulator member to communicate fluid from said valve inlet to the regulating chamber, a valve element movably mounted in the casing, yieldable means holding the valve element in the entrance in the fluid passage in the partition wall to prevent flow of fluid into the fluid passage, and a solenoid carried by the casing for moving the valve element away from the entrance in the fluid passage in the partition wall against the force of the yieldable means effective to let fluid flow through the fluid passage and through the opening defined by the means on said regulator member into the regulating chamber to act on the one face of the regulator member in the regulating chamber to vary the means on said regulator member from the passageway exit formed in said partition wall responsive to the pressure of inflowing fluid to regulate the pressure of the outflowing fluid and provide constant mass flow of said fluid to said outlet at varying inlet pressures.

4. A constant mass flow regulator valve for controlling the flow of fluid therethrough comprising a casing having a fluid inlet and a fluid outlet, a fluid passageway formed in said casing, a flexible regulator member disposed in said casing forming a chamber therebetween with said chamber communicable with said fluid from said fluid inlet, a projecting portion extending from said regulator member, said regulator member having a relatively high spring rate and being movable responsive to pressure variations of said fluid in said chamber operable to position said projecting portion relative to said passageway for effecting a constant mass flow rate to said fluid outlet at varying inlet pressures.

5. A constant mass flow regulator valve for controlling the flow of fluid therethrough according to claim 4 wherein said projecting portion is formed integral with said regulator member.

6. A constant mass flow regulator valve for controlling the flow of fluid therethrough comprising a casing provided with a fluid inlet for receiving fluid under pressure and a fluid outlet for discharging the fluid, a passageway disposed in the casing, a regulator chamber formed in the casing, a regulator member disposed in the valve casing forming one wall of the regulator chamber and having a projecting portion extending therefrom, said regulator member being provided with an opening therein for passing fluid under pressure therethrough from said inlet to said regulator chamber, said regulator member being flexible and having a relatively high spring rate operable to position said projecting portion relative to said passageway effective to deliver a constant mass flow rate of fluid to the fluid outlet responsive to the pressure of the fluid in said regulator chamber.

7. A constant mass flow regulator valve for controlling the flow of fluid therethrough according to claim 6 wherein said projecting portion is formed integral with said regulator member, said opening in said regulator member being disposed so as to extend through said projecting portion on said regulator member.

References Cited by the Examiner

UNITED STATES PATENTS

| 796,959 | 8/05 | Croslen | 137—505.28 XR |
| 1,944,088 | 1/34 | Linderoth | 137—517 XR |
| 2,192,042 | 2/40 | Hoffmann | 137—505.13 XR |
| 2,263,819 | 11/41 | Ray | 251—141 XR |
| 2,399,938 | 5/46 | Pett | 137—487 |
| 2,964,286 | 12/60 | Hoskins | 251—139 XR |
| 3,021,865 | 2/62 | Beckett | 137—82 XR |

FOREIGN PATENTS 1,220,347  1/60  France.

LAVERNE D. GEIGER, *Primary Examiner.*

ISADOR WEIL, *Examiner.*